United States Patent [19]

Buschbom et al.

[11] 4,358,011
[45] Nov. 9, 1982

[54] MATERIAL CONVEYING APPARATUS

[75] Inventors: Floyd E. Buschbom, Long Lake; Glen D. Hansen, Maple Plain, both of Minn.

[73] Assignee: Veda, Inc., Long Lake, Minn.

[21] Appl. No.: 215,456

[22] Filed: Dec. 11, 1980

Related U.S. Application Data

[62] Division of Ser. No. 115,608, Jan. 28, 1980, Pat. No. 4,320,825.

[51] Int. Cl.³ .............................................. B65G 21/08
[52] U.S. Cl. ....................................... 198/861; 49/42; 49/397
[58] Field of Search ........................ 198/841, 860, 861; 248/149, 370, 161, 413, 157; 119/51.11, 52 B, 52 AF, 56 R; 49/42, 371, 397

[56] References Cited

U.S. PATENT DOCUMENTS

| 2,446,936 | 8/1948 | Leithmann et al. | 198/841 |
| 2,710,683 | 6/1955 | McClenny | 198/862 |
| 3,013,529 | 12/1961 | Parker et al. | 119/52 AF |
| 3,773,166 | 11/1973 | Nowacki | 198/841 |
| 3,813,895 | 6/1974 | Klee et al. | 198/861 |

OTHER PUBLICATIONS

*Farm-Eze Belt Conveyor* Article .
Clay "Roller Bed" Belt Feeder & Feeder Conveyor, Bulletin No. BF-301.
*P & D Multi-Lot Belt Feeder*, Copyright 1977.

Primary Examiner—Joseph E. Valenza
Attorney, Agent, or Firm—Burd, Bartz & Gutenkauf

[57] ABSTRACT

A livestock feeding apparatus having an endless belt supported on an elongated table above a feed bunk by a plurality of stands. The stands are laterally and vertically adjustable to level the apparatus and accommodate different sized bunks. The belt has an upper run that rides on a wood deck secured to the support. An idler pulley and drive pulley engages one end of the belt opposite ends. The belt is retained in driving engagement with the drive pulley by a driven roller engageable with the lower run of the belt adjacent the drive pulley. A motor drives the roller at a speed so that the surface speed of the roller is greater than the linear speed of the belt to maintain the lower portion of the run of the belt between the roller and the drive pulley under tension. A sweep assembly slidably mounted on the wood deck operates to move the material off of the side of the top run of the belt into the bunk. The sweep assembly has a roller located in driving engagement with the upper run of the belt and an angularly located drum. Coacting drive members drivably connect the roller with the drum so that on rotation of the roller the drum is rotated to move material off the side of the belt. A reversible motor drivably connected with a cable to the sweep assembly operates to reciprocate the sweep assembly between opposite ends of the support. A belt tightening assembly associated with the pulleys maintains the belt under tension. The belt tensioning assembly includes biasing springs and a linear actuator that adjusts the biasing force on the springs to maintain tension on the belt. A diverter assembly attached to the sweep assembly has a pivotally mounted chute movable to opposite inclined positions to selectively direct the material to opposite sides of the feed bunk.

11 Claims, 30 Drawing Figures

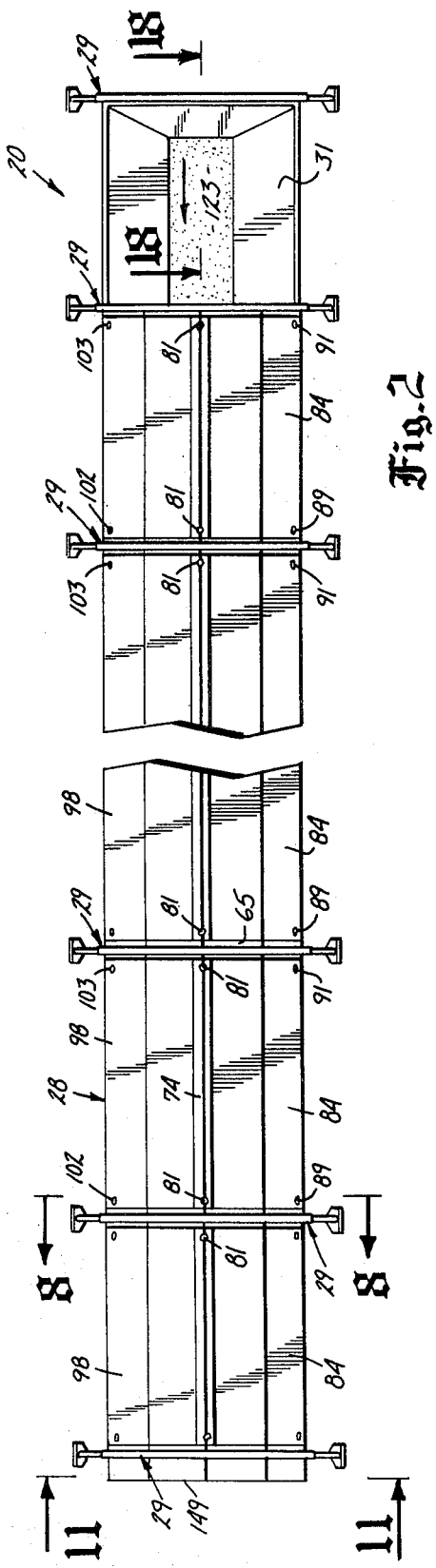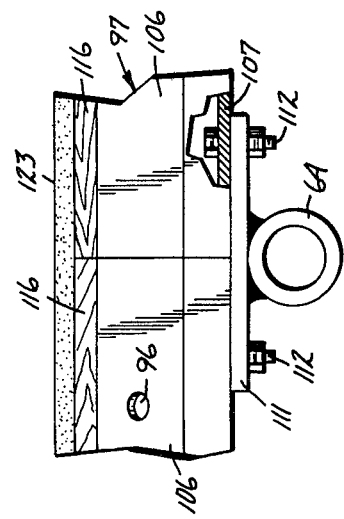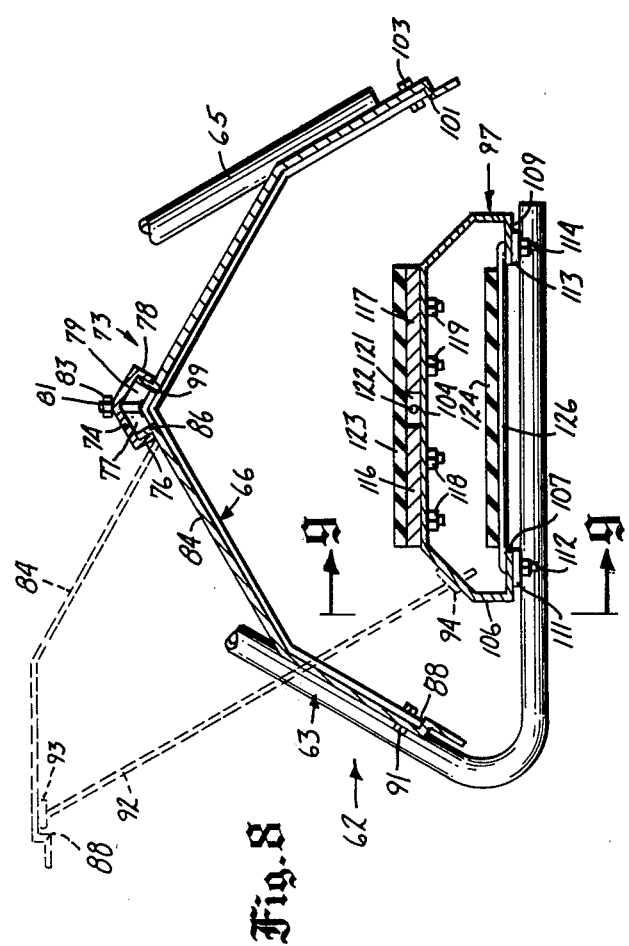

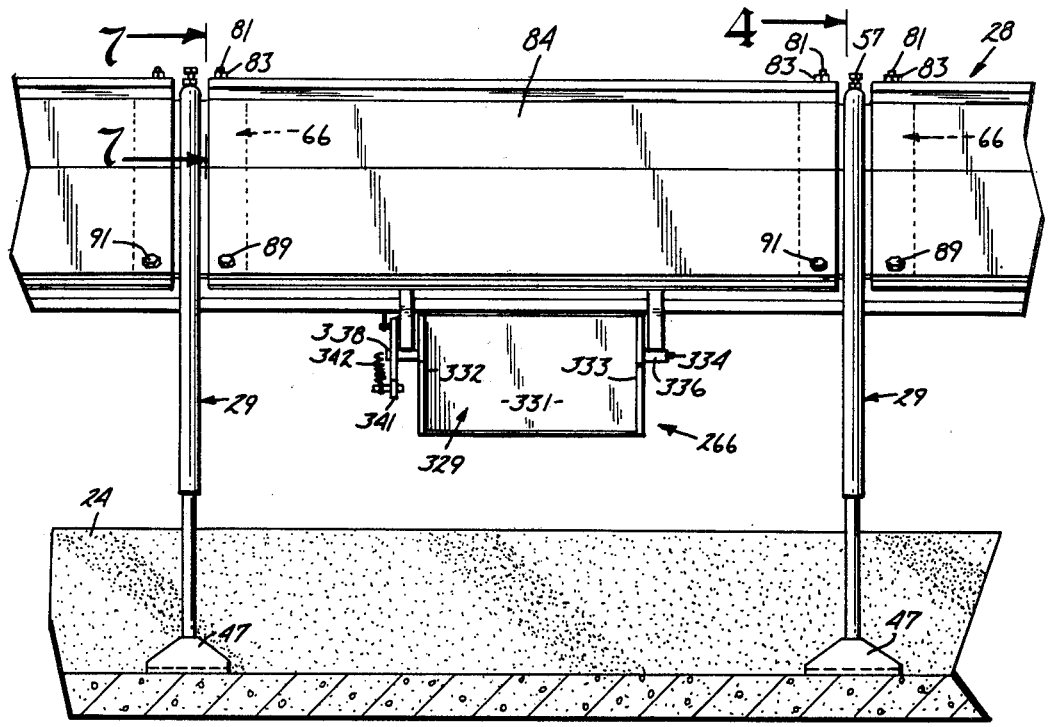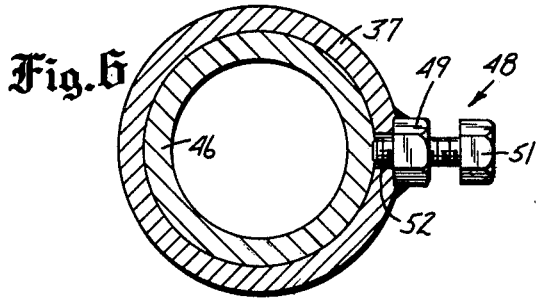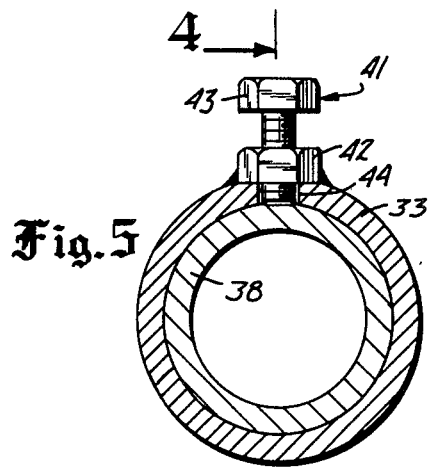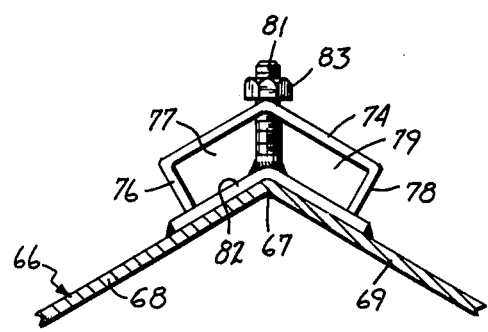

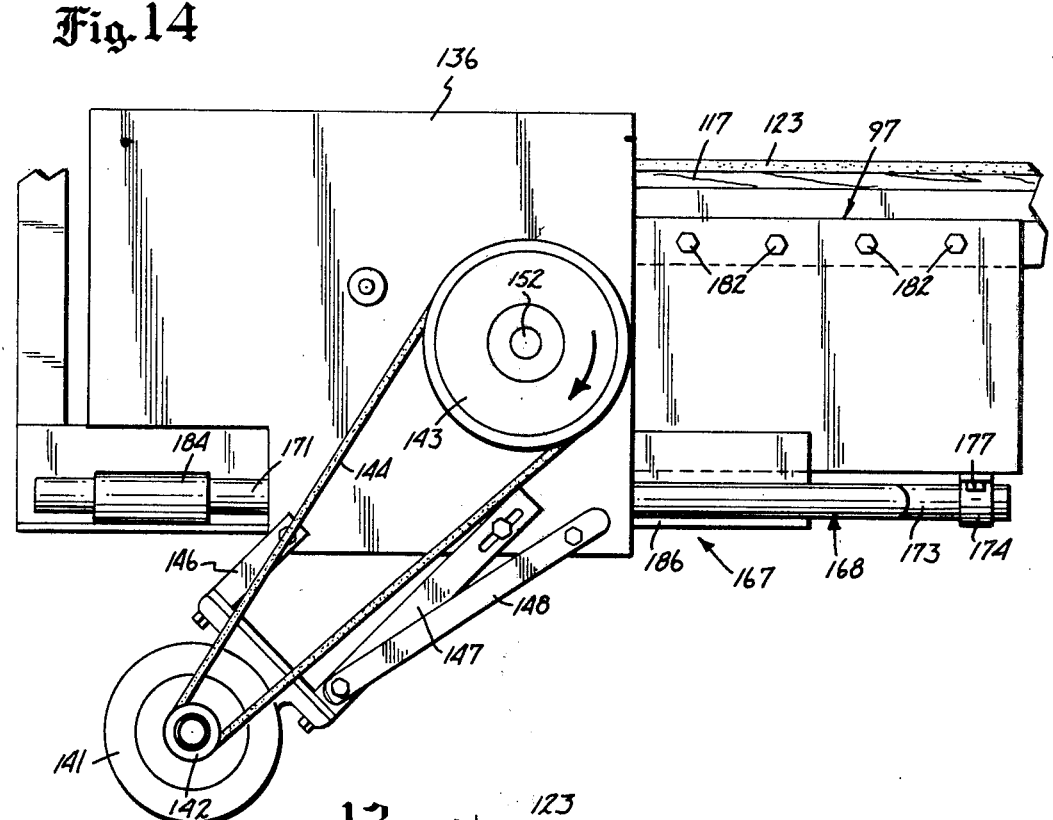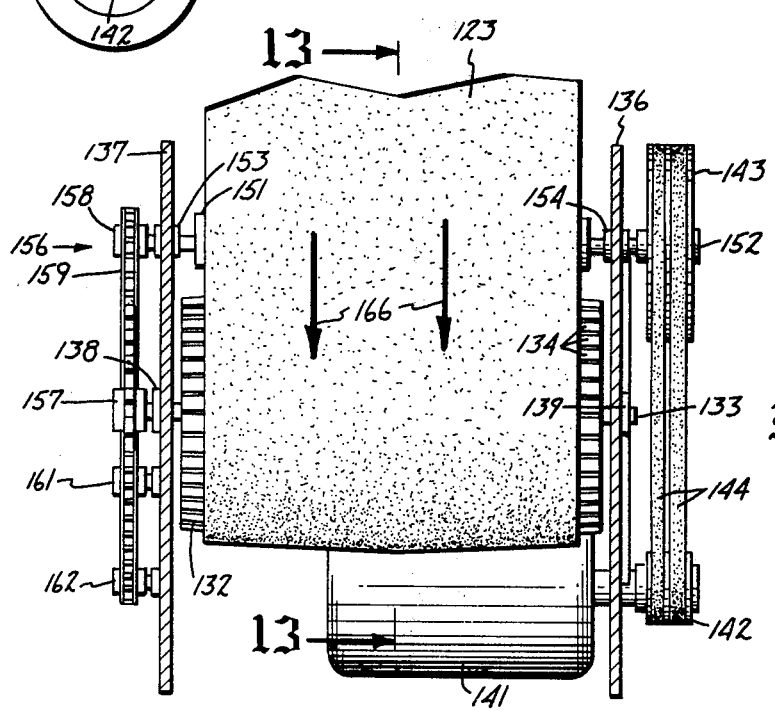

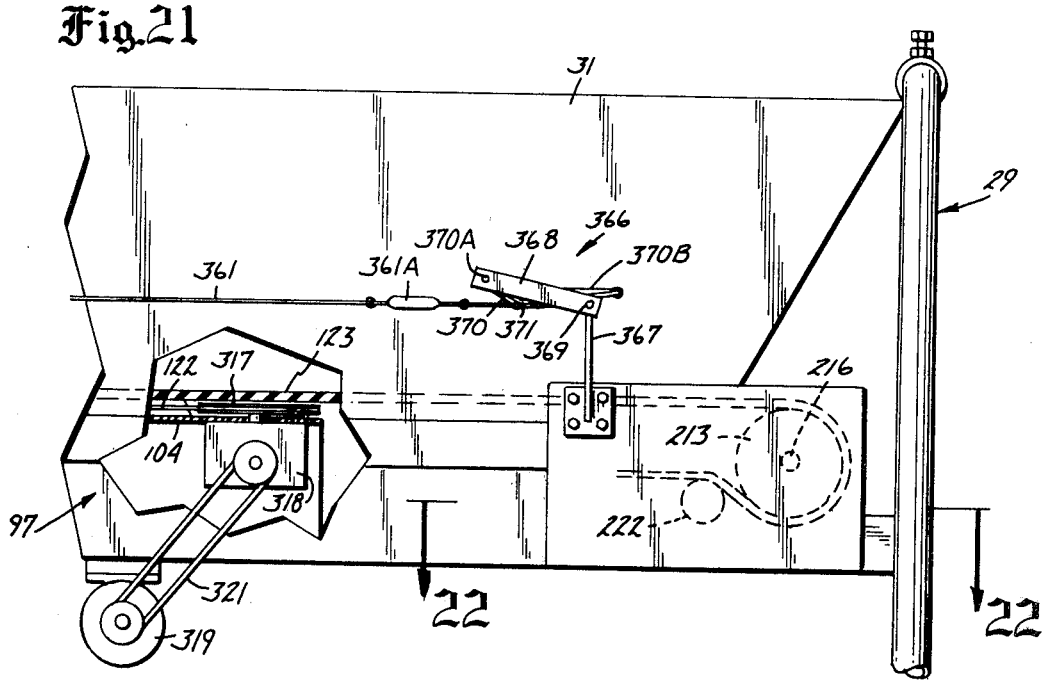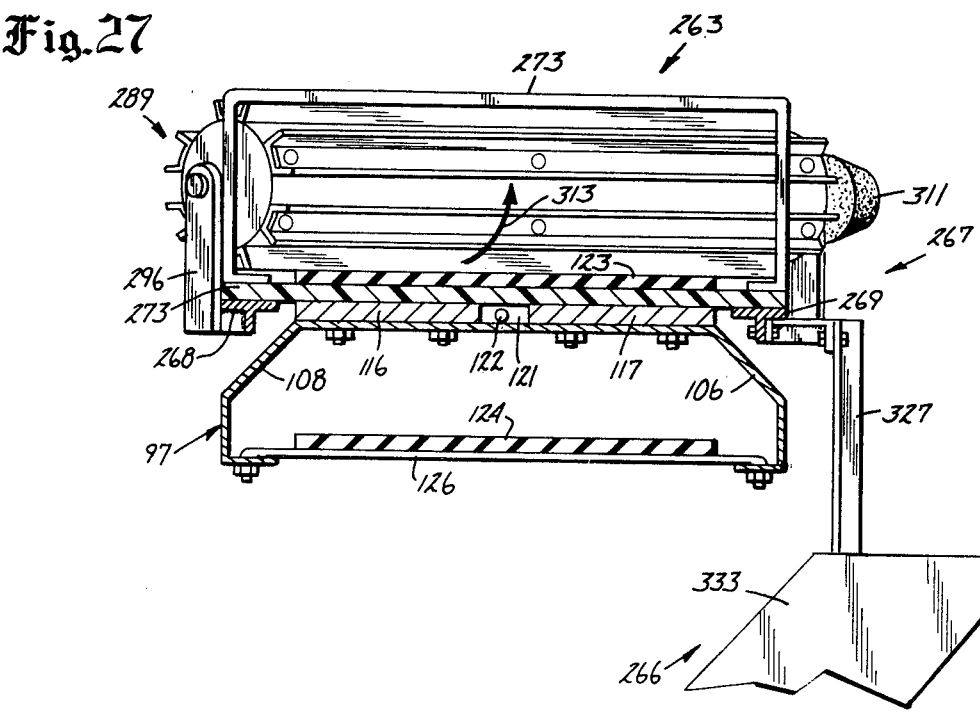

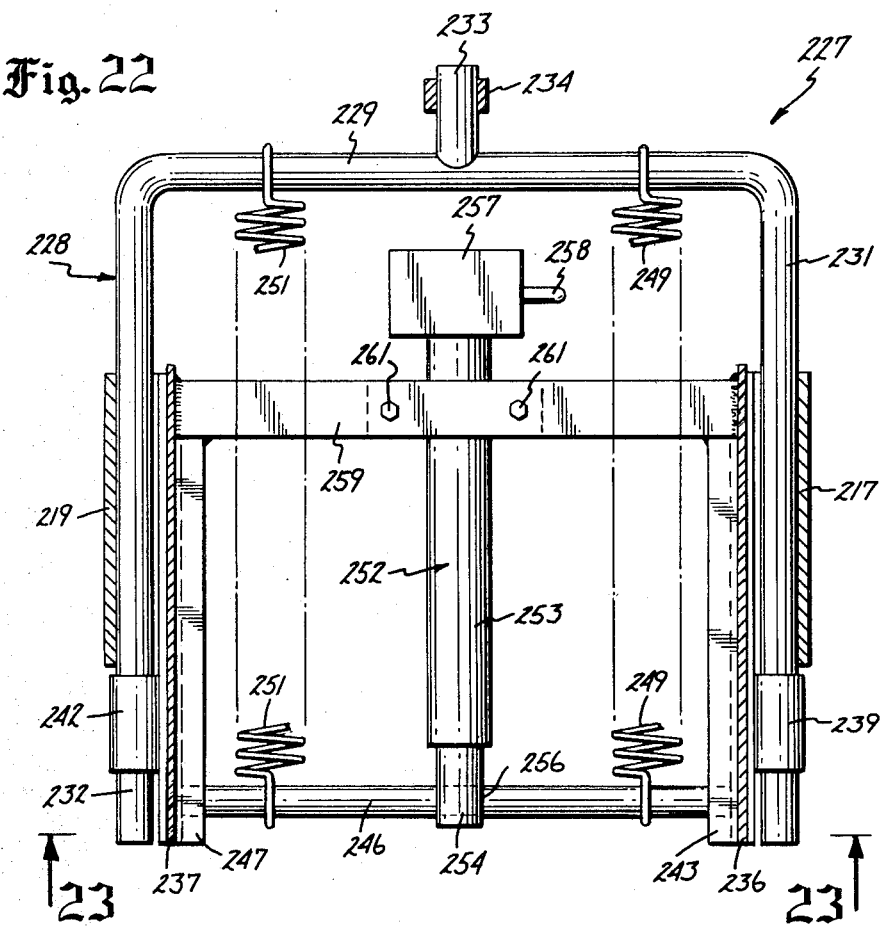
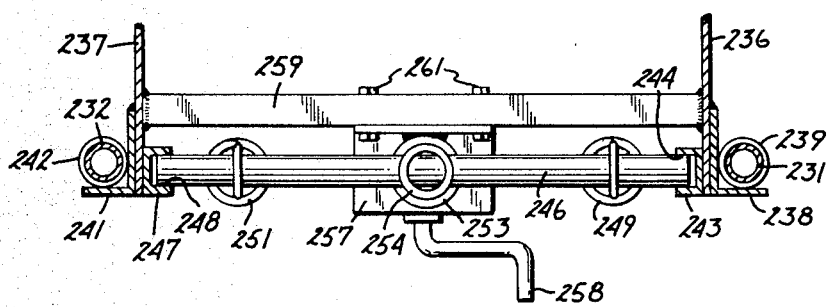

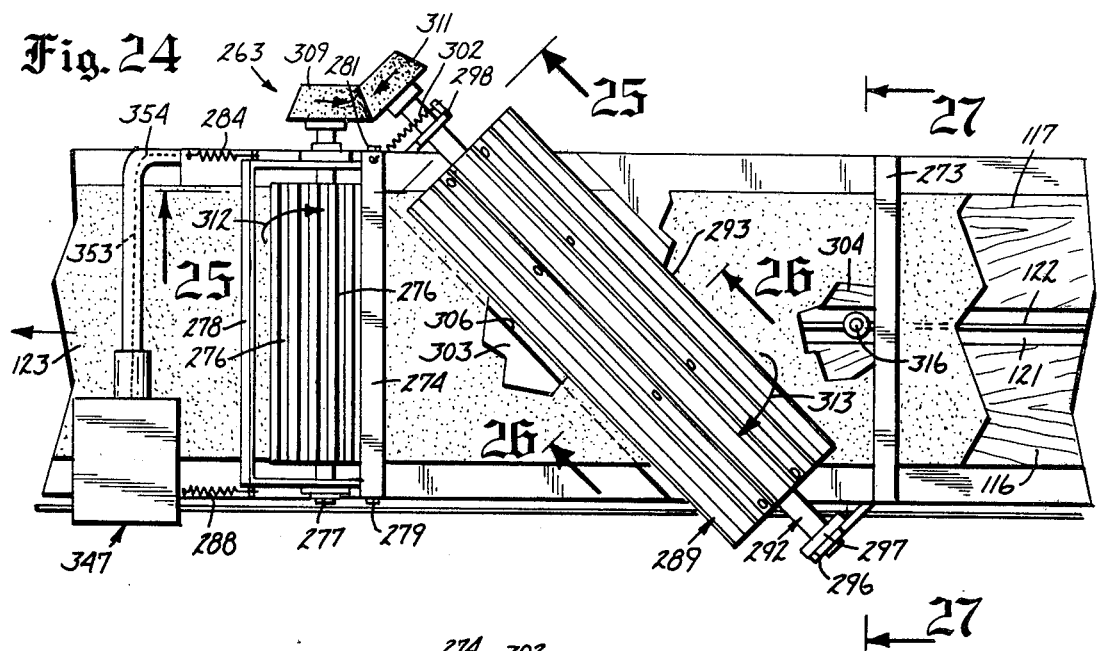
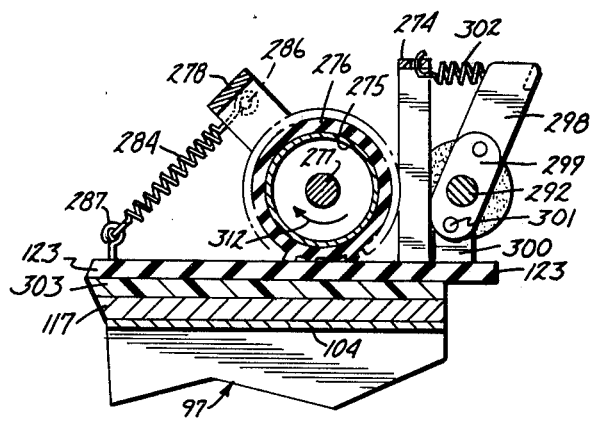
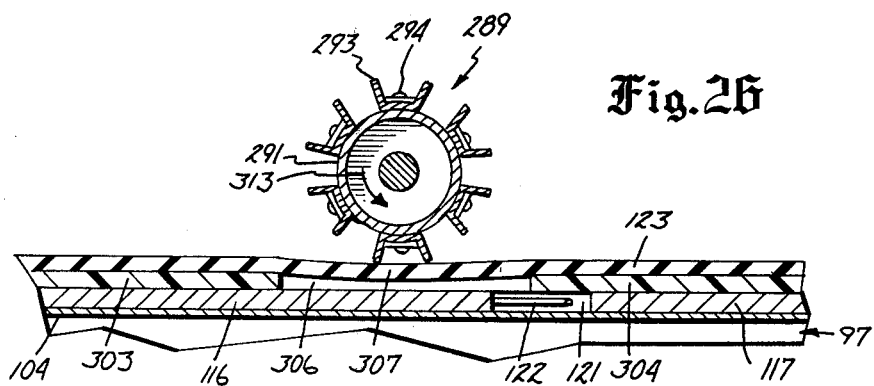

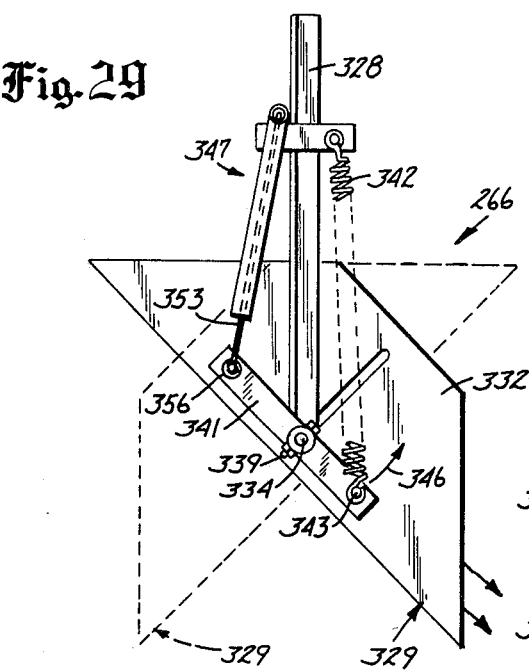
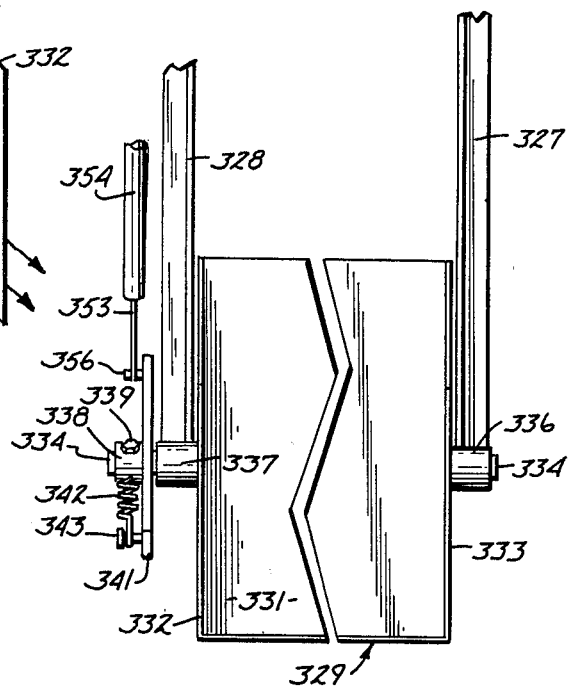
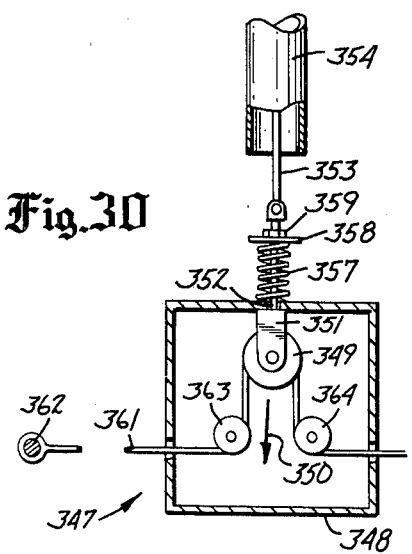
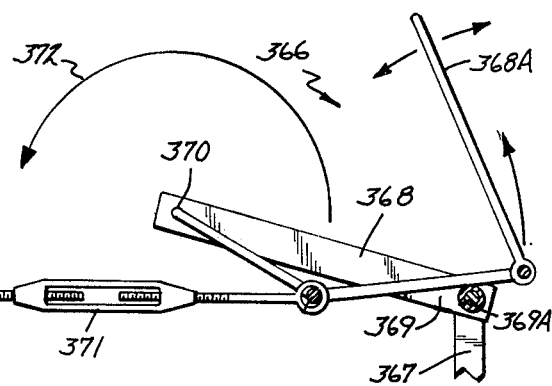

MATERIAL CONVEYING APPARATUS

This application is a division of U.S. application Ser. No. 115,608, filed Jan. 28, 1980, now U.S. Pat. No. 4,320,825, granted Mar. 23, 1982.

SUMMARY OF INVENTION

The invention is directed to a material conveying apparatus for moving material in elongated paths and depositing the material in a selected location. More particularly, the invention is directed to a belt type feeder for dispensing an elongated ribbon of feed into a livestock feeding bunk.

The apparatus has an elongated conveyor assembly supported above a location by a plurality of stands. One end of the conveyor assembly has a hopper for receiving material to be conveyed to a selected location, such as an elongated animal feeding location. Each stand has adjustable leg means which permit the leveling of the conveyor assembly on the support defining the location. The leg means are also laterally adjustable so as to accommodate different size supports. Each stand has means connected to the conveyor assembly for holding the conveyor assembly at a selected elevation above the material receiving location.

The conveyor assembly has an elongated support means having a top portion carrying deck comprising a plurality of elongated wood members. An endless belt is trained about a drive pulley located adjacent the one end of the support and an idler pulley located adjacent the opposite end of the support. The belt has an upper run that rides on the wood members. A relatively small amount of power is required to slide the belt on the wood members, as there is a low coefficient of friction between the belt and wood members. The wood members do not accumulate moisture and water, so that in cold weather the belt does not freeze to its support. The lower run of the belt rides on transverse means attached to the support.

The belt is maintained under tension by a belt tensioning apparatus. The belt tensioning apparatus has a first means movably mounted on the support and attached to the drive pulley. A second means is movably mounted on the support adjacent the first means. Biasing means connect the first means with the second means. An adjustable means, as a linear actuator, is connected to the second means and is operable to adjust the tension of the biasing means thereby adjusting the tension on the belt. In a short conveyor assembly the idler pulley can be mounted to fixed frame structure that is attached directly to the support. A conveyor assembly that has considerable length is provided with a belt tensioning apparatus associated with the drive pulley and idler pulley. The belt tensioning apparatus has biasing means associated with adjustable means to vary the tension of the biasing means and thereby control the tension of the belt from both ends of the belt. The belt tensioning apparatus operates to automatically compensate for changes in belt length or belt stretch. The adjustable means is also used to release the tension on the belt.

The belt is maintained in driving relation with the outer surface of the drive pulley to minimize the slipping of the drive pulley relative to the belt. The belt engages more than 180 degrees of the outer surface of the drive pulley. A driven roller engages the lower run of the belt adjacent the drive pulley. The roller is located adjacent the forward side of the belt to locate the belt in contact with more than 180 degrees of the outer surface of the drive pulley. The increased contact area of the belt on the drive pulley reduces slippage of the drive pulley relative to the belt. The roller is driven with a motor at a speed so that the linear speed of the outer surface of the roller is greater than the linear speed of the outer surface of the drive pulley thereby keeping the portion of the lower run of the belt between the roller and the drive pulley under tension. A power transmission drivably connects the roller with the drive pulley so that the roller and drive pulley are simultaneously driven by the motor.

A sweep assembly slidably located on the wood members reciprocates between opposite ends of the support to laterally remove the material from the top run of the belt. The material is directed by a diverter means into the feed bunk. The sweep assembly has a drive roller located in driving relation with the belt. A material removing drum extends diagonally across the belt in front of the drive roller. Power transmitting means operatively connect the drive roller with the drum so that the drive roller rotated by the moving belt will rotate the drum to remove the material carried by the top run of the belt off the side of the belt. A separate motor is not used to rotate the material removing drum. The material falls either directly into the feed bunk or into the diverter which directs the material to one side of the feed bunk. A reversible motor connected with a cable to the sweep assembly operates to reciprocate the sweep assembly between opposite ends of the support. Motor reversing control means including limit switches operate the motor in reverse directions. The sweep assembly actuates the limit switches at each end of the support to reverse the motor thereby reversing the direction of movement of the sweep assembly.

The diverter has a U-shaped chute that is selectively located in two oppositely inclined positions to direct material to opposite sides of the feed bunk. A control means connected to the chute operates to hold the chute in a selected inclined position. The control means includes a hand operated over center lever means and a cable connecting the lever means with the chute.

The belt and support are located under cover means mounted on the stands. The cover means includes a plurality of covers that are movably mounted on ridge means. The ridge means extend between adjacent stands and are attached to cover supports connected to the stands. Each cover can be moved to an open position to facilitate inspection, maintenance, and repair of the sweep assembly, belt and support.

IN THE DRAWINGS

FIG. 2 is a fragmentary top plan view of FIG. 1;

FIG. 3 is an enlarged side elevational view of a section of the material dispensing apparatus of FIG. 1;

FIG. 5 is an enlarged sectional view taken along the line 5—5 of FIG. 4;

FIG. 6 is an enlarged sectional view taken along the line 6—6 of FIG. 4;

FIG. 7 is an enlarged sectional view taken along the line 7—7 of FIG. 3;

FIG. 8 is an enlarged sectional view taken along the line 8—8 of FIG. 2;

FIG. 9 is an enlarged sectional view taken along the line 9—9 of FIG. 8;

FIG. 12 is an enlarged sectional view taken along the line 12—12 of FIG. 11;

FIG. 14 is a right side elevational view of FIG. 12;

FIG. 21 is a side elevational view partly sectioned of the hopper end of the material conveying apparatus of FIG. 1;

FIG. 22 is a sectional view taken along the line 22—22 of FIG. 21;

FIG. 23 is a sectional view taken along the line 23—23 of FIG. 22;

FIG. 24 is a top plan view of the sweep assembly for removing material from the top run of the belt;

FIG. 25 is a sectional view taken along the line 25—25 of FIG. 24;

FIG. 26 is a sectional view taken along the line 26—26 of FIG. 24;

FIG. 27 is a sectional view taken along the line 27—27 of FIG. 24;

FIG. 28 is a front elevational view of the diverter assembly attached to the sweep assembly;

FIG. 29 is a side elevational view of the left side of FIG. 28; and

FIG. 30 is a diagrammatic view of the control unit for the control apparatus for the diverter assembly.

DESCRIPTION OF PREFERRED EMBODIMENTS

Figure 1:
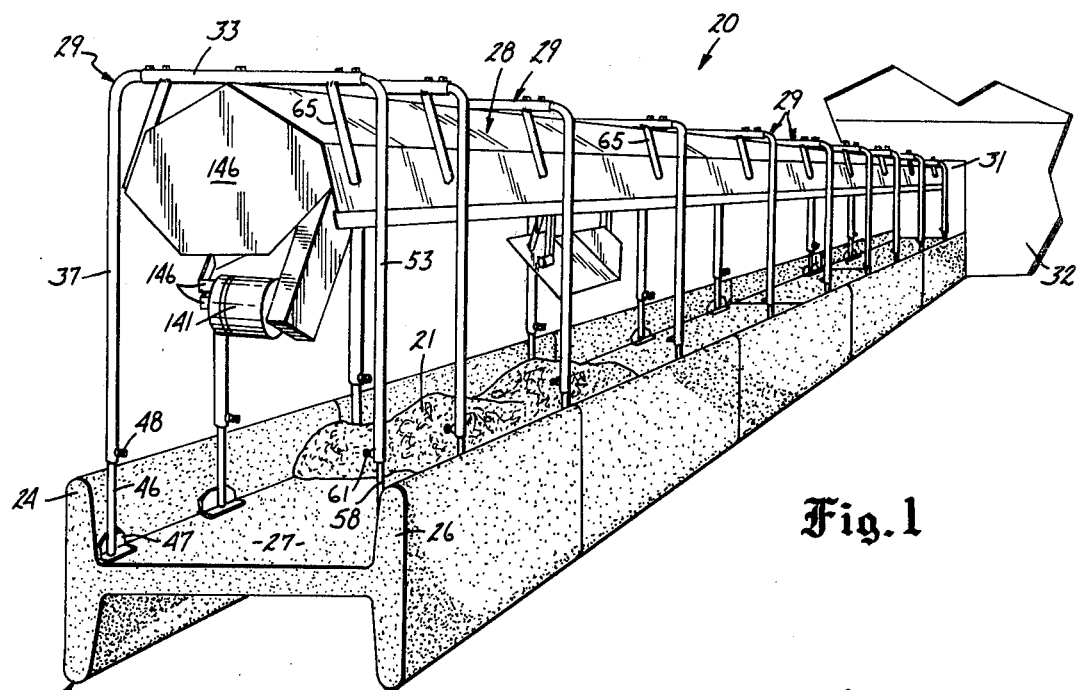
FIG. 1 is a perspective view of the material conveying apparatus of the invention mounted on an elongated feed bunk.

Referring to FIG. 1, there is shown the material conveying apparatus of the invention indicated generally at 20 operable to carry material 21 to an elongated material receiver indicated generally at 22, such as a feed bunk. The apparatus is a material conveying machine useable to move particulate and granular type materials. These materials can be animal feeds, fertilizers, earth, sand, gravel, granular metal and plastic, sawdust and the like. The following description is directed to apparatus 20 used to convey and discharge animal feeds into a feed bunk 22. Other uses of the apparatus are not to be precluded.

Bunk 22 has a generally horizontal base or platform 23 joined at its opposite edges to upright side walls 24 and 26. Side walls 24 and 26 extend above the plane of base 23 and form a material receiving location or feeding area 27. The lower ends of the side walls 24 and 26 rest on a supporting surface, such as the ground or a concrete slab. Bunk 22 is made up of generally end-to-end bunk units to form an elongated feeding area. Bunk 22 is made of rigid material, as concrete. Other materials can be used to make bunk 22. Also, other types of bunks or material receiving structures can be used with the material conveying apparatus 20.

Apparatus 20 has an elongated conveyor assembly indicated generally at 28 located above bunk 22. A plurality of stands or supports indicated generally at 29 support conveyor assembly 28 in an elevated position above bunk 22 so that conveyor assembly 28 functions to discharge material in an elongated ribbon or row into feeding area 27. Apparatus 20 is operable to dispense particulate materials, including, but not limited to, animal feeds comprising a mixture of a concentrate and roughages. The roughages can be silage, haylage, and the like. The concentrates include ground grains, minerals, and grain meals. A large open top hopper 31 is located at the one end of conveyor assembly 28 for receiving the material. The material may be discharged from a structure 32, as a silo, bin or barn, or a self-unloading feed wagon, conveyor, or the like.

Figure 4:
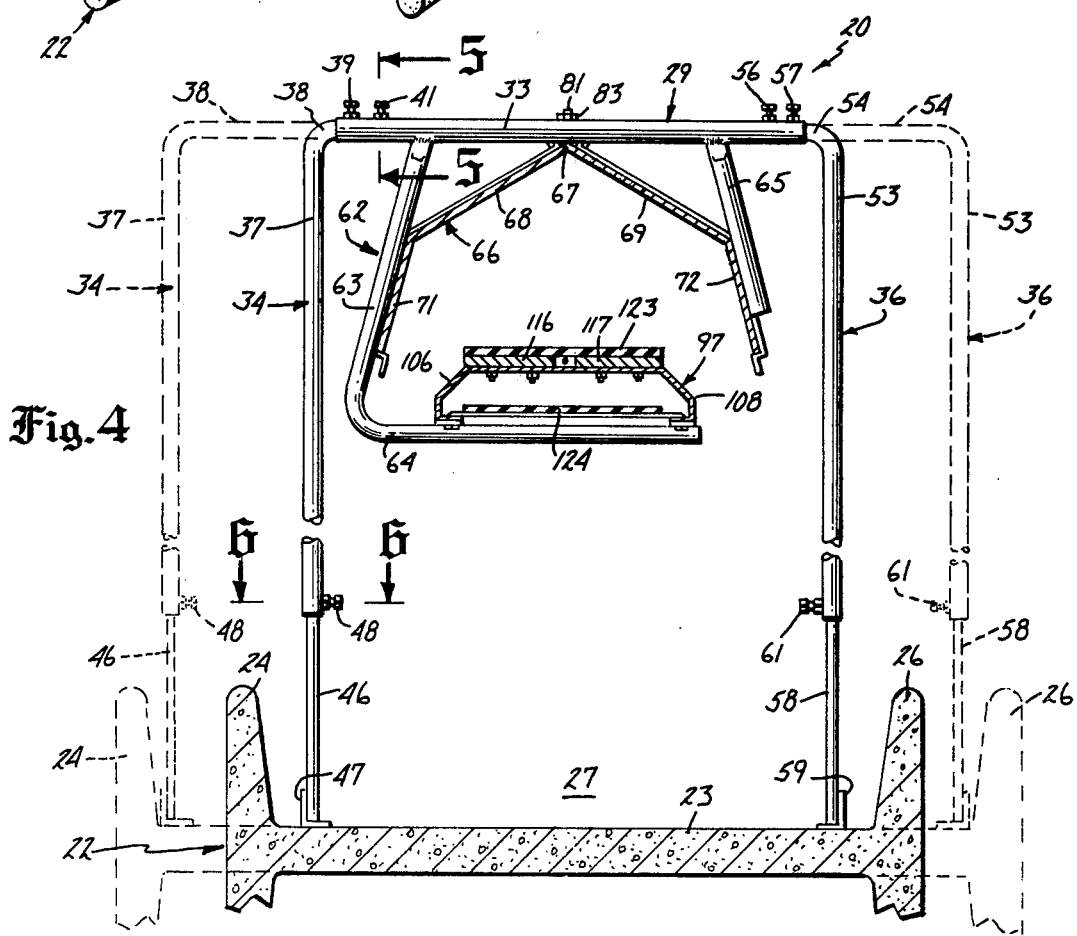
FIG. 4 is an enlarged sectional view taken along the line 4—4 of FIG. 3.

Stand 29, as shown in FIG. 4, has a transverse or cross member 33 connected to downwardly directed leg assemblies 34 and 36. Cross member 33 is a tubular member that is a hanger for supporting conveyor assembly 28 above bunk 22. Leg assembly 34 has a first upright member 37 joined to an inwardly directed horizontal arm or member 38. Member 38 telescopes into the left end of tubular member 33 and is secured thereto with a pair of lock means 39 and 41. As shown in FIG. 5, lock means 41 comprises a nut 42 secured by a weld or like to tubular member 33. A bolt 43 is threaded through nut 42 into a hole 44 in member 38. The forward end of nut 43 is turned into a tight gripping relationship with member 38 and thereby locks member 38 on cross member 33. Lock member 39 is identical to lock means 41.

Returning to FIG. 4, leg assembly 34 has a second downwardly directed member 46 telescoped into the lower end of member 37. A foot 47 is secured to the bottom of member 46. Foot 47 is a right angled member having a bottom resting on base 34. A lock means 48 secures member 46 to member 37. Referring to FIG. 6, lock means 48 comprises a nut 49 secured by welds or the like to the inside of tubular member 37. A bolt 51 threads through nut 49 and extends into a hole 52 in member 37 and engages member 46. Bolt 51 can be released whereby member 46 can be longitudinally adjusted relative to member 37 and thereby adjust the height of stand 29.

Second leg assembly 36 has a first upright member 53 joined at its upper end to a horizontal arm or member 54. As shown in FIG. 4, member 54 is telescoped into the right end of tubular cross member 33 and secured thereto with a pair of lock means 56 and 57. Lock means 56 and 57 are identical in structure to the lock means 41, as shown in FIG. 5. A second upright member 58 is telescoped into the lower end of member 53 and is secured thereto with a lock means 61. Lock means 61 is identical in structure to lock means 48. A foot 59 is secured to the lower end of member 58 and rests on the top of base 53 adjacent side wall 26. Lock means 61 permits member 58 to be longitudinally adjusted relative to member 53 whereby the height of the stand can be adjusted. Lock means 39, 41, 56, and 57 can be released so that the width of stand 29 can be adjusted to accommodate different widths of bunks 22. As shown in broken lines in FIG. 4, the leg assemblies 34 and 36 can be adjusted outwardly to accommodate a wider bunk 22.

An L-shaped first arm 62 has a downwardly and outwardly directed section 63 joined at its lower end to an inwardly generally horizontal section 64. The upper end of section 63 is secured by welds or the like to the left end section of cross member 33. A second arm 65 secured by welds or the like to cross member 33 extends downwardly and outwardly opposite arm 62. An inverted cover support 66 is located between and secured to the arms 62 and 65. Cover support 66 has a center or apex portion 67 that engages the center of cross member 33. Cover support 66 has a generally inverted U-shape and comprises first sections 68 and 69 that extend downwardly and outwardly from center 67 and second side sections 71 and 72 join to sections 68 and 69 forming a one-piece cover support.

A plurality of cover units indicated generally at 73 located between adjacent stands 29 enclose the top of the material conveying structure of the conveyor assembly. The following description is directed to a cover unit 73 located between adjacent stands 29. All of the cover sections are identical in structure and can be selectively opened to permit inspection, servicing, and repair of the conveyor structure, sweep assembly and diverter subsequently described herein.

Cover unit 73 has a longitudinal top ridge 74, as shown in FIG. 7. Ridge 74 has a first downwardly extended longitudinal lip 76 forming a pocket 77. The opposite side of ridge 74 has a second downwardly directed longitudinal lip 78 forming a pocket 79. A bolt 81 secured to an angled bracket 82 extends through a hole in one end of ridge 74. A nut 83 threaded on bolt 81 secures ridge 74 to bolt 81. Angle bracket 82 is secured by welds or the like to a cover section 65 located between adjacent walls 84 and 98 of the cover 28. Each end of ridge 74 is secured with a nut and bolt structure, as shown in FIG. 7, at its opposite ends to a cover section 65.

As shown in FIG. 8, cover unit 73 has a first wall 84 of sheet material, such as sheet metal, covering one side of the conveyor assembly. Wall 84 has a transverse upwardly directed top flange 86 located in pocket 77 behind lip 76. Wall 84 fits between a longitudinal slit mouth 87 below flange 76. The lower edge of wall 84 has an inwardly directed longitudinal shoulder 88 that fits over the lower edge of cover support 66 to hold flange 86 in engagement with flange 76. Fasteners 89 and 91, as nut and bolt assemblies, attach the lower edges of wall 84 to adjacent cover supports 66. The nuts of the fasteners 89 and 91 can be secured by welds or the like to the inside of support 66. Nuts 83 are released from ridge 74 and fasteners 89 and 91 are removed allowing wall 84 to be pivoted upward to an open position, as shown in broken lines in FIG. 8, to provide access to the structure under the cover. The upper edge of wall 84 pivots around the lower edge of lip 76 and opposite portions of wall 84 slide on cover 66 when wall 84 is swung open. A linear rod 92 is used to hold wall 84 in the open position. The upper end of the rod has a block 93 that engages shoulder 88. The lower end of rod 92 is secured to a ring or collar 94 spaced inwardly from the end of the rod so that the end of the rod can project through a hole 96 in a table 97.

Cover unit 73 has a second wall 98 comprising an angled sheet member having an upwardly directed top longitudinal flange 99 located in pocket 79 adjacent the inside of lip 78. The lower edge of wall 98 has an inwardly directed linear shoulder 101 engageable with the lower edge of cover support 66. A plurality of fasteners 102 and 103, such as nut and bolt assemblies, releasably secure the lower portions of wall 98 to cover support 66. Fasteners 102 and 103 can be removed allowing wall 98 to be pivoted upwardly to an open position. Walls 84 and 98 can be removed from the ridge 74 by pivoting each wall to a generally upright position whereby flanges 86 and 89 can be moved outwardly from under lips 76 and 78, respectively.

Figure 10:
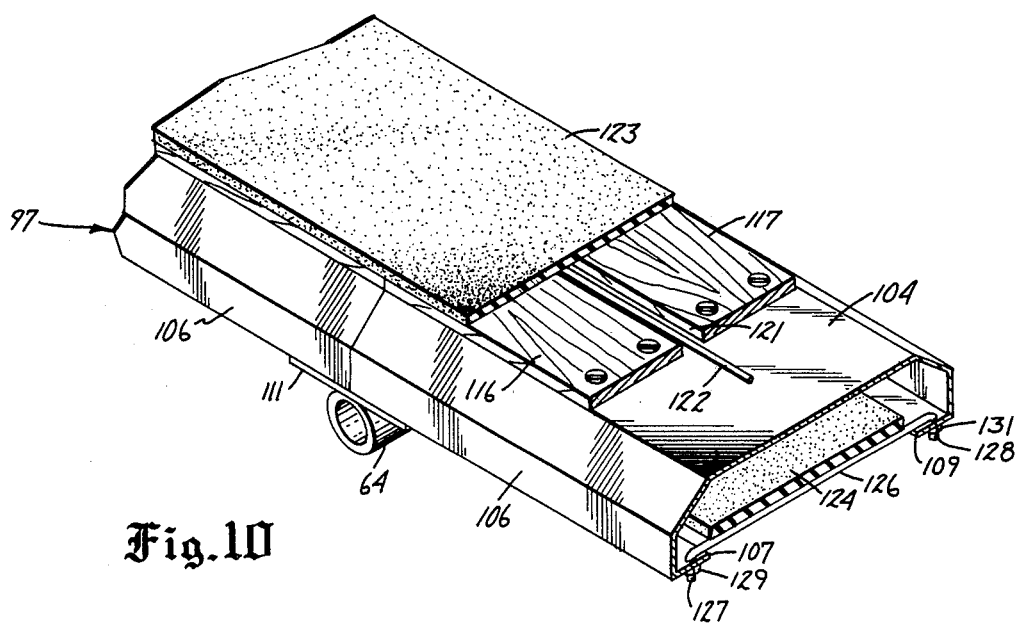
FIG. 10 is a perspective view of a portion of the belt and support therefor of the conveyor assembly.

Referring to FIGS. 8, 9, and 10, a table or conveyor support indicated generally at 97 has a generally flat top wall or platform 104 joined to downwardly directed obtuse angled side walls 106 and 108. Side wall 106 has an inwardly directed flange 107 secured to a short plate 111. As shown in FIG. 9, plate 111 is secured by welds to arm section 64. A plurality of fasteners 112, as nut and bolt assemblies, attach plate 111 to flange 107. Side wall 108 has an inwardly directed flange 109 engageable with a plate 113. Plate 113 is secured by welds to the outer end of arm sections 64. A plurality of fasteners 114 secure flange 109 to plate 113.

A pair of flat deck members or strips of wood 116 and 117 are secured to top of platform 104 with fasteners 118 and 119, as nut and bolt assemblies. Members 116 and 117 extend longitudinally along the top of platform 104. Members 116 and 117 each comprise a plurality of end-to-end wood boards, or plywood sheets, having generally flat horizontal top surfaces. The surfaces are located in generally the same horizontal plane. The adjacent inside edges of members 116 and 117 are laterally spaced from each other forming an elongated linear groove or slot 121 along the center line of the table 97. A cable 122 is located in groove 121. The function of the cable is hereinafter described.

An endless belt 123, as a canvas or rubber belt, rides on the top surfaces of wood members 116 and 117. Belt 123 has a lower run 124 that moves between the side walls 106 and 108. Lower run 124 rides on a plurality of transverse rods 126 secured at their opposite ends to the flanges 107 and 109. The rods 126 have downwardly directed ends 127 and 128 that extend through holes in flanges 107 and 108. Nuts 129 and 131 threaded on the ends 127 and 128, respectively, secure the rods to the flanges. Rods 126 are spaced about every meter along table 97 and support and locate the lower run 124 of the belt between side walls 106 and 108. This locates the lower run of the belt in protected position that does not interfere with the animals feeding in bunk 22. The material discharged by conveyor assembly is not engaged by the lower run 124 of the belt, since it is in a protected location below platform 104 and between side walls 106 and 108.

Table 97 comprises a plurality of sections that are located in end-to-end, as shown in FIG. 10. Plates 111 and 113 support adjacent ends of the table sections. Fasteners 112 and 114 secure the table sections to the plates whereby the entire table is a fixed support for the moving belt 123. The bottom surface of the upper run of belt 123 is located in engagement with the top surfaces of wood members 116 and 117. Wood members 116 and 117 do not accumulate moisture that in cold weather turns to frost and ice that fixes the belt to its support thereby preventing movement of the belt. The wood members 116 and 117 also absorb and retain lubricants, as oil and waxes, that reduce the friction coefficient between the belt and wood members 116 and 117.

Figure 11:
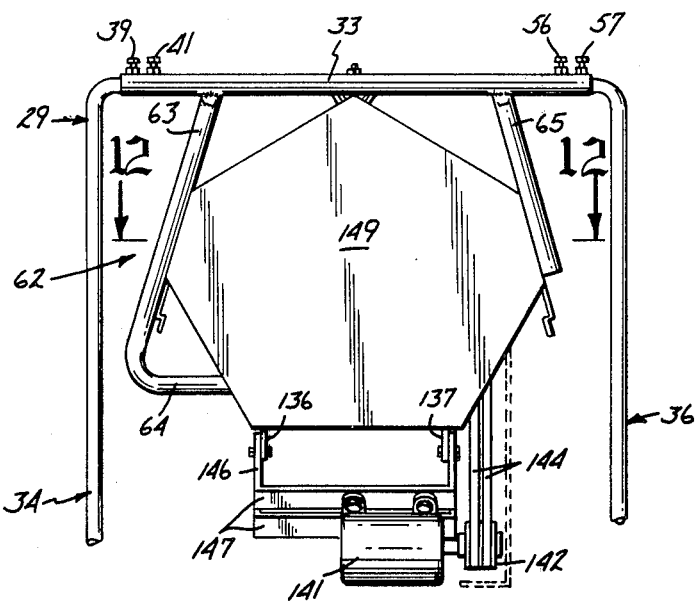
FIG. 11 is an enlarged end elevational view of the left end of the material conveying apparatus of FIG. 2 taken along the line 11—11 and looking in the direction of the arrows.

As shown in FIG. 11, the drive end or rear of conveyor assembly 28 is closed with an upright cover 149. Referring to FIG. 12, the drive end of the conveyor assembly 28 has a drive pulley indicated generally at 132 accommodating belt 123. Pulley 132 has a shaft 133, circular end members 133A, and a plurality of circumferentially spaced bars 134 attached by welds to end members 133A. Bars 134 are in a generally cylindrical arrangement with adjacent bars being spaced from each other to provide an open pulley. Bars 134 have a slight outwardly convex shape providing the pulley with a generally central crown to maintain belt 123 in central driving relation with pulley 132. Pulley 132 is located between side plates 136 and 137. A bearing 138 rotatably mounts shaft 133 on plate 136. Bearing 139 rotatably mounts shaft 133 on plate 137.

Figure 13:
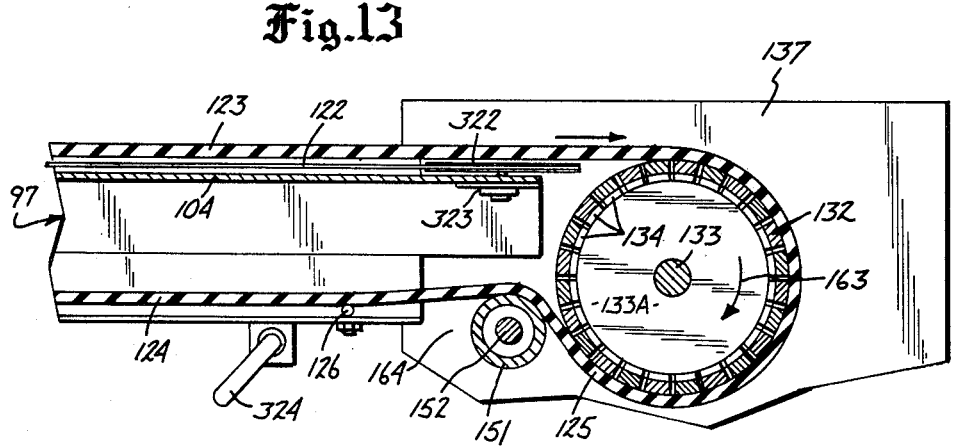
FIG. 13 is a sectional view taken along the line 13—13 of FIG. 12.

As shown in FIGS. 12 and 13, a transverse roller 151 engages the lower run 124 of belt 123 adjacent the drive pulley 132. A roller 151 is located in a position so that belt 123 engages more than a 180 degree sector of the pulley 132. This increases the area of the pulley that engages the inside of the belt 123 and increases the driving effectiveness of pulley 132. Roller 151 has a transverse shaft 152 rotatably mounted on plates 136 and 137 with bearings 153 and 154.

Pulley 132 is rotated with a motor 141, as an electric motor, located below pulley 132. The power is transmitted from motor 141 to shaft 152 with a drive pulley 142 mounted on the motor drive shaft, a driven pulley 143 mounted on shaft 152 and a plurality of belts 144 drivably connecting the pulleys 142 and 143. Motor 142 is attached to U-shaped mounts 146 and 147 that are secured by nut and bolt assemblies to plates 136 and 137. As shown in FIG. 14, a strut 148 is attached to mount 147 and plate 136 to hold the motor in an adjusted position and thereby control the tension of belts 144.

Figure 15:
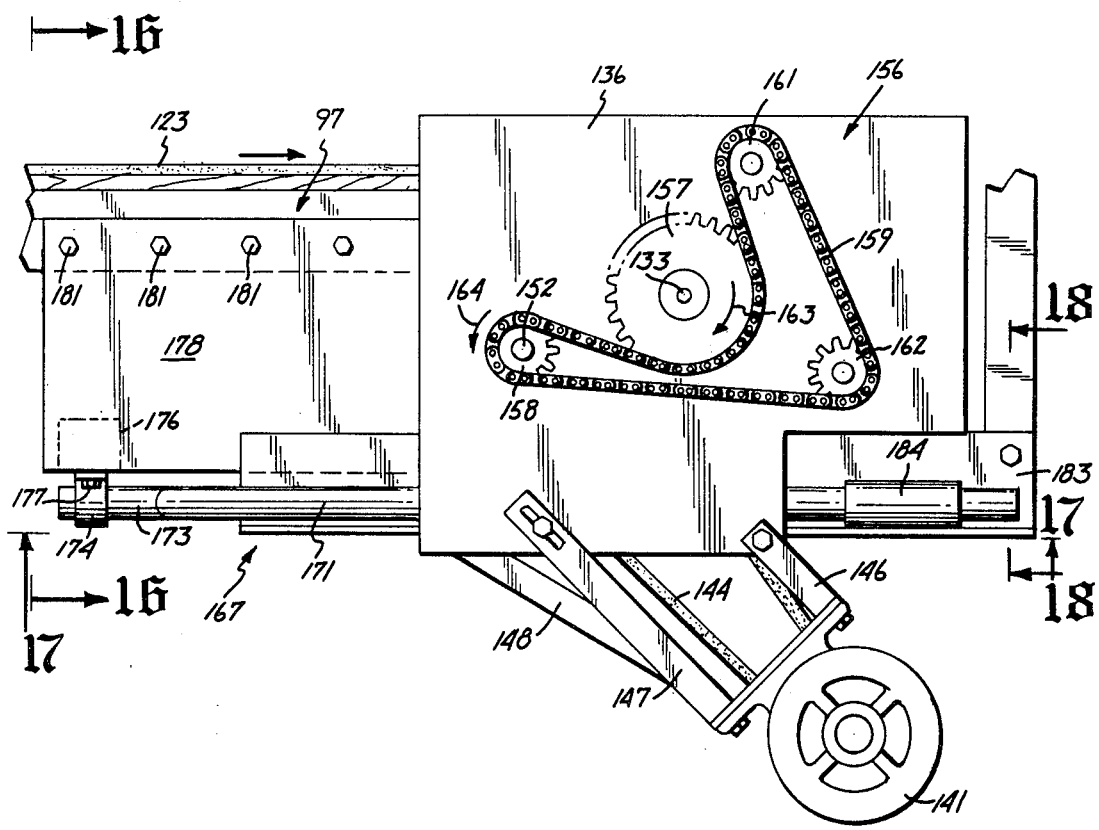
FIG. 15 is a left side elevational view of FIG. 12.

Referring to FIG. 15, a power transmission means indicated generally at 156 drivably connects the drive pulley shaft 133 with roller 151. Power transmission means 156 has a first sprocket 157 mounted on shaft 133. A second sprocket 158 is mounted on shaft 152. An endless roller link chain 159 is trained about the sprockets 157 and 158 and a pair of idler sprockets 161 and 162. Sprocket 158 is driven by motor 141 in a counterclockwise direction, as shown by arrow 164. Sprocket 157 is driven from sprocket 158 via chain 159 in a clockwise direction, indicated by arrow 163. Roller 151 is driven at a speed so that the speed of the outer surface of roller 151 that engages the lower run 124 of the belt 123 is faster than the speed of the inside surface of belt 123 that engages drive pulley 132. The outer surface of roller 151 is a continuous cylinder that has a linear speed in feet per minute that is faster than the linear speed of the belt 123. Thus, the roller 151 is continuously slipping on the belt thereby applying a pulling or tension force to belt segment 125. This difference in the linear surface speeds of roller 151 versus pulley 132 insures that the segment 125 of the belt 123 between pulley 132 and roller 151 is under tension. This insures firm engagement of belt 123 with the outer surface of pulley 132. Roller 151 is located forward of and above the bottom portion of drive pulley 132 so that belt 123 engages more than 180 degrees of pulley 132; for example, 200 degrees of the circumference of pulley 132. The location of roller 151 relative to pulley 132 can be changed to alter the contact arc of belt 123 on pulley 132.

Figure 16:
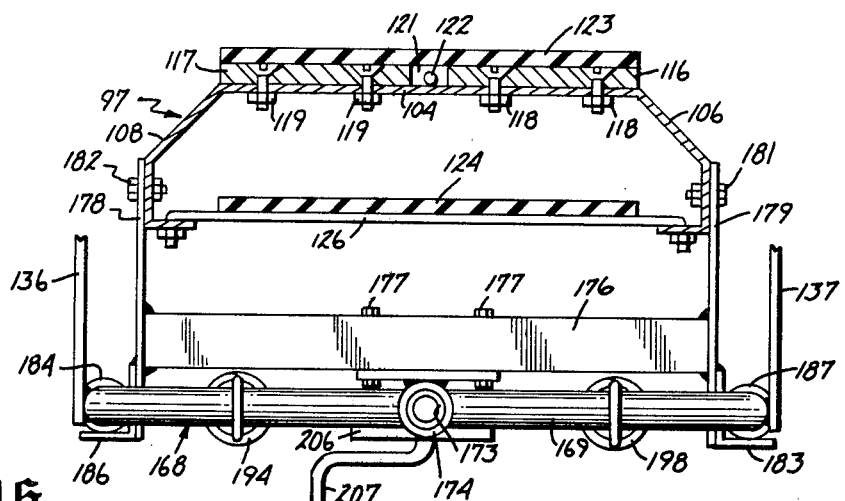
FIG. 16 is a sectional view taken along the line 16—16 of FIG. 15.

Referring to FIGS. 15-18, there is shown a belt tensioning assembly indicated generally at 167 operable to automatically maintain a selected tension on belt 123. Tension assembly 167 has a movable yoke 168 comprising a cross member or body 169 and a pair of rearwardly directed horizontal legs 171 and 172. A forwardly directed cylindrical neck 173 is secured to the center portion of cross member 169. Neck 173 extends through a sleeve 174 attached to a frame cross member 176 with a plurality of fasteners or bolts 177. Yoke 168 can move in a longitudinal direction relative to sleeve 174. The opposite ends of cross member 176 are attached to generally upright frame plates 178 and 179. As shown in FIG. 16, frame plates 178 and 179 are attached with a plurality of fasteners 181 and 182, respectively, to the opposite sides of table 97. Leg 171 is located adjacent an outwardly directed flange of an angle member 183 secured to frame plate 178. A horizontal sleeve 184 is secured to a rear portion of member 186 to accommodate a rear end portion of leg 171. Side plate 136 is secured to leg 171. Opposite side plate 137 is secured to leg 172 so that the side plates 136 and 137 move with yoke 168. A second angle member 183 is secured to the outside of frame plate 179. Angle member 183 is an outwardly directed flange located below leg 172. A sleeve 187 secured to angle member 183 slidably accommodates a rear end portion of leg 172.

Figure 17:
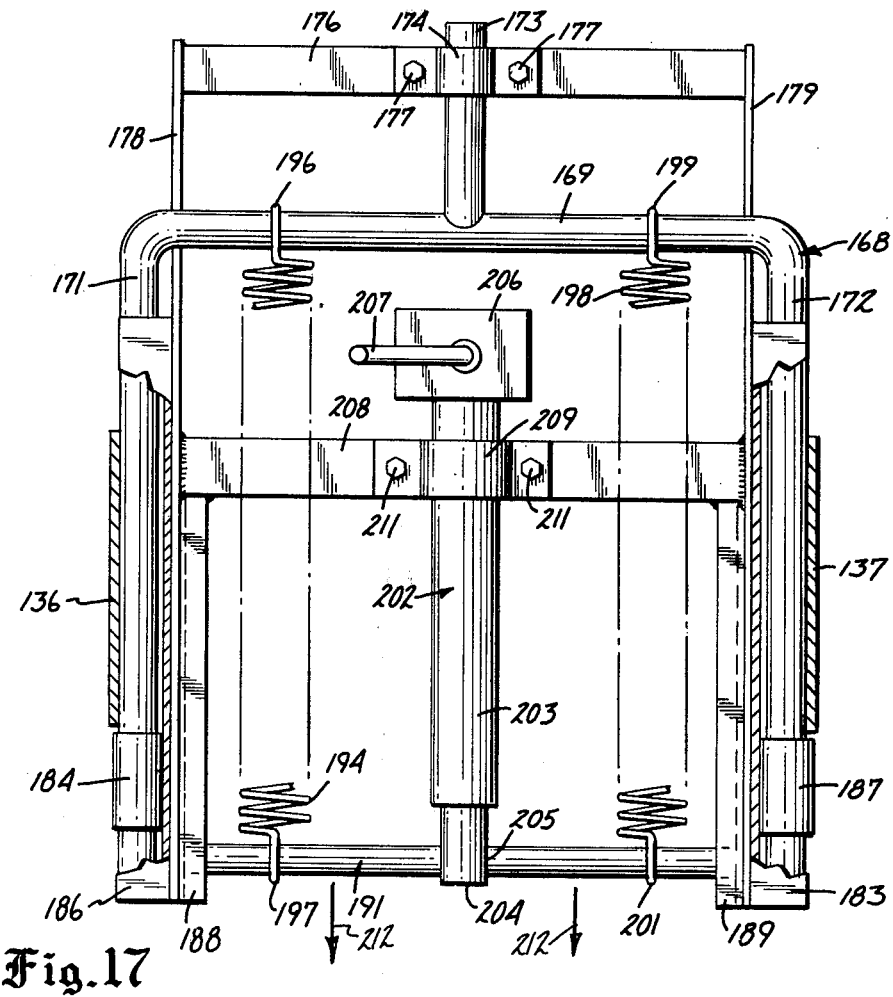
FIG. 17 is a sectional view taken along the line 17—17 of FIG. 15.
Figure 18:
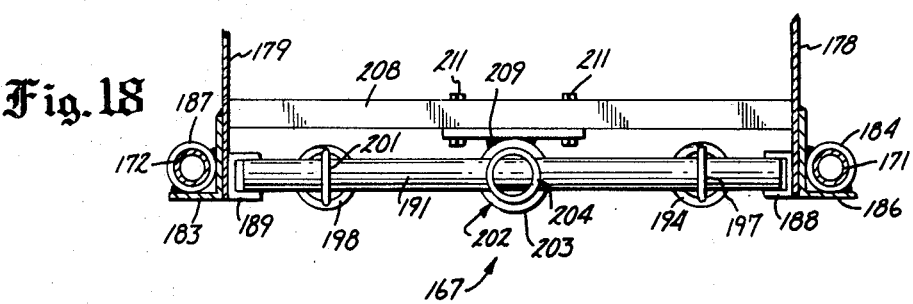
FIG. 18 is a sectional view taken along the line 18—18 of FIG. 15.

Referring to FIGS. 17 and 18, a first horizontal channel member 188 is secured to the inside of frame plate 178. Channel member 188 extends in a horizontal longitudinal direction and has an open channel or longitudinal groove 192 for slidably accommodating an end of a cross bar 191. The opposite end of cross bar 191 is located and cooperates with a second longitudinal horizontal channel member 189 secured to the inside of frame plate 179. Channel member 189 has a longitudinal channel or groove 193 accommodating the opposite end of cross bar 191. Yoke 168 is biased in a belt tightening direction by a pair of longitudinal tension springs 194 and 198. As shown in FIG. 17, spring 194 has a first hook end 196 located about cross member 169 and a second hook end 197 located about cross bar 191. Spring 198 has a first end 199 extended about the cross member 169 and a second hook end 201 extended about cross bar 191.

A longitudinal linear actuator indicated generally at 202 is located between and along the center line of yoke 168 and between springs 194 and 198. Linear actuator 202 has a cylindrical housing or casing 203 slidably accommodating a cylindrical moving member or piston 204. Member 204 has a transverse hole 205 accommodating the center portion of cross bar 191. A gear box 206 attached to housing 203 is operated with a hand crank 207 to selectively elongate or contract the piston 204. Housing 203 is secured to a fixed cross member 208 with a bracket 209 and a plurality of fasteners 211, such as nuts and bolts. Fasteners 211 clamp bracket 209 about housing 203 to fix the position of housing 203 on cross member 208. The opposite ends of cross member 208 are secured by welds to frame plates 178 and 179. Hand crank 207 is operable to rotate gear box 206 which, in turn, selectively moves piston 204 in or out of housing 203. This causes cross bar 191 to move along the channel members 188 and 189 in the direction of arrows 212, as shown in FIG. 17. Springs 194 and 198 transmit linear force to yoke 168 and thereby apply tension on belt 123 as drive pulley 132 is mounted on side plates 136 and 137. The belt tension is automatically maintained by the springs 194 and 198 as the belt stretches and contracts during use.

Figure 19:
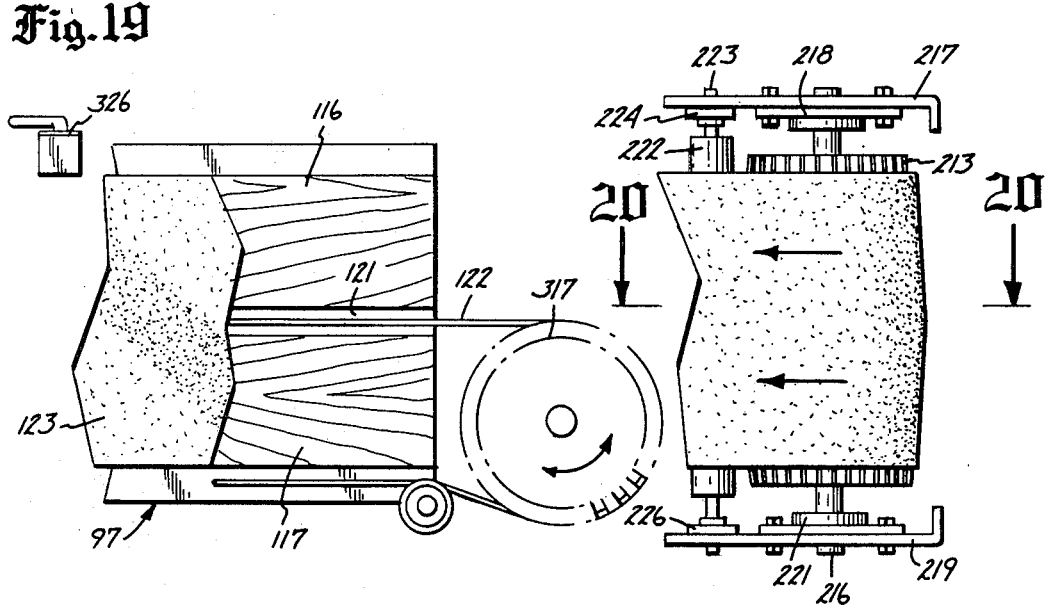
FIG. 19 is a top plan view partly sectioned of the hopper end of the material conveying apparatus.
Figure 20:
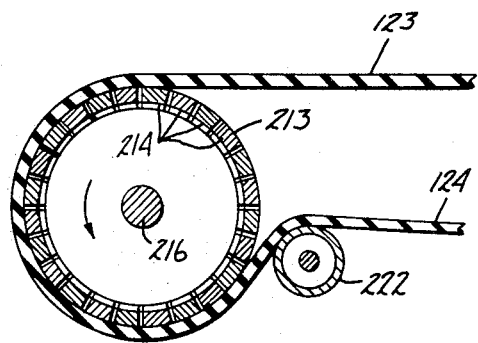
FIG. 20 is a sectional view taken along the line 20—20 of FIG. 19.

Referring to FIGS. 19, 20, and 21, the hopper end of belt 123 is trained about an idler pulley 213 located below and forward of the bottom or discharge opening of hopper 31. Pulley 213 is an open crowned pulley having a plurality of circumferentially arranged transverse bars 214 and a transverse shaft 216. As shown in FIG. 19, shaft 216 is mounted on a plate 217 with a bearing 218 and a plate 219 with a bearing 221. The lower run 124 of the belt adjacent pulley 213 rides over a transverse roller 212. Roller 212 has a shaft 223 rotatably carried in bearings 224 and 226 mounted on plates 217 and 219, respectively. As shown in FIG. 20, roller 222 retains the belt 123 in more than 180 degree engagement with pulley 213. Plates 217 and 219 can be mounted directly on the fixed table 97 so that the belt 123 is tensioned by tension assembly 167.

In long conveyor assemblies, the long belt 123 is also automatically tensioned with a second belt tensioning assembly indicated generally at 227 in FIG. 22. The belt tension assembly 227 is substantially the same as belt tension assembly 167 and operates to automatically maintain tension on belt 123. Belt tension assembly 227 has a movable yoke 228 having a transverse or cross member 229 and a pair of longitudinal legs 231 and 232. The mid-section of cross member 229 has a longitudinal neck 233 slidably disposed in a sleeve 234. Sleeve 234 is fixed to the frame with a cross member (not shown). Legs 231 and 232 are located adjacent outsides of longitudinal frame plates 236 and 237 secured to table 97. Leg 231 is located along an angle member 238 secured to frame 236. Angle member 238 carries a sleeve 239 accommodating an end portion of leg 231. A second angle member 241 is secured to the outside of frame plate 237. Angle member 241 carries a sleeve 242 accommodating end portion of leg 232.

A first channel member 243 is longitudinally located along the inside of frame plate 236 and secured thereto. Channel member 243 has a longitudinal channel or groove 244 accommodating an end of a cross bar 246. The opposite end of cross bar 246 is slidably located in a channel or groove 248 of a second channel member 247 secured to the inside of frame plate 237.

A pair of coil tension springs 249 and 251 are connected to cross member 229 of the yoke 228 and the cross bar 246. A linear actuator indicated generally at 252 is longitudinally positioned between springs 249 and 251. Linear actuator 252 has a cylindrical housing 253 slidably accommodating a movable member or piston 254. The outer end of piston 254 has a transverse hole 256 accommodating the center of cross bar 246. The piston 254 is moved into and out of an end of housing 253 with a gear box 257 operable with a hand crank 258 to selectively extend and contract the linear actuator 252. Housing 253 is fixed to a cross frame member 259 with a plurality of fasteners 261 and a bracket (not shown). The ends of frame member 259 are attached to linear actuator 252 operable to move cross bar 246 in the direction of the arrow 262 thereby applying tension to springs 249 and 252. This translates into tension on belt 123 as the idler roller 213 is rotatably mounted on plates 217 and 219 attached to yoke 228. The actuator 252 is operated to adjust the tension on springs 249 and 251 and thereby automatically adjust the tension on belt 123.

The moving belt 123 carries the material from the hopper 21 along the length of conveyor assembly 28. The material, shown at 264 in FIG. 24 on belt 123, is removed from the top of the belt by a discharge or sweep assembly indicated generally at 263. Sweep assembly 263 moves the material off the sides of belt 123 into a diverter 266, shown in FIG. 24, which directs material to one side of bunk 22. The diverter 266 can swing to a second position where the material is directed to the opposite side of bunk 22.

Sweep assembly 263 has a pair of longitudinal side members 268 and 269 located adjacent opposite sides of table 97. As shown in FIG. 27, sheet members 272 and 273, of plastic or like material, rest on top of wood members 116 and 117 to slidably support the sweep assembly 263 on the wood members 116 and 117 below the belt 123. Other structures can be used to movably mount the side members 268 and 269 on table 97. Side members 268 and 269 are connected to each other with a pair of inverted U-shaped cross members 273 and 274.

As shown in FIGS. 24 and 25, a first cylindrical roller 275 having an outer resilient sleeve 276 extends transversely across belt 123 and is in driving engagement with the top of belt 123. First roller 275 has a transverse shaft 277 rotatably mounted on a generally U-shaped frame 278, with bearings 282 and 283. Pivots 279 and 281 pivotally mount the frame 278 to opposite sides of cross member 274. Roller 275 is biased in engagement with belt 123 by a pair of springs 284 and 288. Spring 284 is connected to U-shaped frame 278 with an eye bolt 286 and side member 268 with an eye bolt 287.

A second roller or drum indicated generally at 289 is driven by first roller 275 extended diagonally across belt 123 to continuously remove material 264 carried by belt 123 into diverter 266. Drum 289 has a cylindrical sleeve 291 attached to a shaft 292. A plurality of outwardly directed flexible ribs or flanges 293 extend the length of sleeve 291 and are attached thereto with fasteners 294, such as nut and bolt assemblies. As shown in FIG. 24, the right end of shaft 292 is supported in an upright bracket 296 with a bearing 297. The left end of shaft 292 is mounted on a lever 298 with a bearing 299. The lower end of lever 298 is movably mounted to a bracket 300 with a pivot pin 301. A spring 302 is hooked to the upper end of lever 298 and cross member 274 to bias the left end of shaft 292 toward roller 275. A pair of cone-shaped members 309 and 311 transmit power from roller 275 to drum 289. Cone member 309 is secured to the shaft 277 and has an outer cone-shaped surface in driving engagement with an outer cone-shaped surface of cone member 311. Cone member 311 is secured to the shaft 292. Spring 302 biases the outer face of cone member 311 into friction driving relation with the outer face of cone member 309.

Sheet members 272 and 273 are spaced from each other with a diagonal groove or space 306. As shown in FIGS. 24 and 26, groove 306 is located immediately below drum 289. Drum 289 engaging belt 123 causes the belt 123 to flex down into groove 306 so that the flexible flanges 293 move into continuous and firm engagement with the top of belt 123 as drum 289 rotates.

In use, on movement of belt 123 the material moves from hopper 31 and is carried by belt 123 along a linear path to sweeper assembly 263. The moving belt rotates the first roller 275 in the direction of the arrow 212. The rotating movement of roller 275 is transmitted to drum 289 through the cone-shaped drive and driven members 309 and 311, respectively. Spring 302 biases roller 311 into driving friction engagement with cone member 309. Rotating drum 289 rotates in the direction of the arrow 313 so that material 264 on belt 123 is swept off the side of belt 123, as shown by arrow 314. The material falls into diverter 266 and is directed thereby to bunk 22. The material can fall directly into bunk 22 as a ribbon or row of material.

As shown in FIG. 24, cable 122 located in slot 121 is attached with a connector 316 to sheet member 272. Cable 122 extends along the slot 121 between the members 116 and 117. Below hopper 31, cable 122 extends around a cable drive pulley 317 which directs cable 122 to one side of table 97. A gear box 318 attached to the bottom of table 97 drives pulley 317. A motor 319, as an electric motor, is mounted on the bottom of table 97. A belt and pulley drive 321 drivably connects motor 319 to gear box 318. As shown in FIG. 13, an idler pulley 321 is located at the drive end of table 97. Idler pulley 321 is rotatably mounted on table 97 with a bearing 323. Motor 319 is a reversible electric motor that is controlled by a pair of limit switches 324 and 326. Limit switch 324 is mounted on table 97 adjacent the drive end of the table. Limit switch 326 is mounted adjacent the hopper end. Downwardly directed arms 327 and 328 secured to sweep assembly 269 selectively engage limit switches 324 and 326 to reverse motor 319 whereby the sweep assembly reciprocates on support members 116 and 117 from adjacent the hopper end of the conveyor assembly to the drive end of the conveyor assembly.

Diverter 266, as shown in FIGS. 28 and 29, has a generally U-shaped chute 329. Chute 329 is a sheet member having a generally flat bottom wall 331 and upright side walls 332 and 333. The opposite ends of the chute are open so that material directed to the chute is moved in a downward direction by the inclined bottom wall 331. A transverse axle 334 is secured to the mid-section of the bottom of bottom wall 333. As shown in FIG. 28, the right end of axle 334 is rotatably mounted in a sleeve 336 attached to bottom of arm 327. A similar sleeve 337 attached to the lower end of arm 328 rotatably supports the opposite end of axle 334. A hub 338 is attached with a bolt 339 to axle 334 adjacent sleeve 337. An arm 341 is secured to hub 338. One end of arm 341 is attached to a tension spring 342 with a bolt 343. The upper end of spring 342 is connected with a bolt 344 to the upper end of arm 328 to bias the diverter chute 329 in a counterclockwise direction, as indicated by arrow 346 in FIG. 29. A diverter control indicated generally at 347 holds the diverter chute 329 in the inclined position, as shown in FIG. 29, against the biasing force of spring 342. When diverter control 347 is released, spring 342 moves chute 329 to an opposite inclined position, as shown in broken lines in FIG. 29, so as to allow the material to dispense toward the opposite side of bunk 22. A side shield (not shown) can be attached to the sweep assembly to limit lateral or outward movement of material moving from the side of belt 123.

Referring to FIG. 30, diverter control 347 has a box or housing 348 mounted on member 268 movable with sweep assembly 263. Housing 348 has a chamber for accommodating a portion of a cable 361. One end of cable 361 is connected with a fastener 362 to a section of table 97 adjacent the drive pulley 132. Cable 361 engages a pair of idler pulleys 363 and 364 rotatably mounted within housing 348 and a control pulley 349. Pulley 349 is rotatably mounted on a yoke 351 attached to a rod 352. Cable 353 is secured to the outer end of rod 352. Cable 353 extends through a tubular member or tube 354. As shown in FIGS. 24, 26 and 27, tube 354 curves downwardly adjacent the side of table 97 and terminates above arm 341. Cable 353 is secured with a bolt 356 to the outer end of arm 341. A tension spring 357 located about rod 352 engages housing 348 and a washer or collar 358 around rod 352. A nut 359 threaded on rod 352 adjusts the compression of spring 357. Spring 357 functions to maintain tension on cable 361.

A hand lever assembly indicated generally at 366 is mounted on the frame adjacent hopper 31 and is operable to increase the tension on cable 361 to move control pulley 39 in an outward direction, as shown by arrow 350 in FIG. 30. This pulls cable 353 and moves arm 341 in an upward direction against the tension of spring 342 and holding the diverter chute 349 in the inclined position, as shown in full lines in FIG. 29.

Hand lever assembly 366 is pivotally mounted on a fixed mount 367 attached to the side plate 219. A hand-operated obtuse angle lever 368 is pivotally connected with pivots 370 to the outer end of fixed arms 369 secured to the top of mount 367. A turnbuckle connector 371 joins the end of cable 361 to the mid-section of lever 368. A handle 368A is pivoted to the outer or free end of lever 368 to facilitate pivoting of the lever about pivots 370. When lever 368 is moved in a clockwise direction, as indicated by arrow 372, cable 361 is moved to its relaxed position. Spring 342 will then move arm 341 counterclockwise or in the direction of arrow 346, as shown in FIG. 29, to pivot the diverter chute 329 to its opposite position, as shown in the broken lines. When lever 368 is pivoted in a clockwise direction opposite arrow 372 to the full line position, cable 353 is placed under tension and held in tension. This pivots diverter chute 329 to its full line position, shown in FIG. 29, against biasing force of spring 342. The outer or free end of lever 368 rests on a fixed cross member 369A joined to adjacent ends of mount 367 and arms 369. The mid-portion of lever 368 is located below a line passing through cross member 369A and pivot 370 so that lever 368 is held in its tension position by the tension on cable 361.

While there has been shown and described the embodiments of the material conveying apparatus, it is intended that changes in the structure and arrangement of the structure can be made by one skilled in the art without departing from the invention. The invention is defined in the following claims.

The embodiments of the invention in which an exclusive property or privilege is claimed are defined as follows:

1. An apparatus for conveying material comprising: an elongated support having an elongated top wall, a plurality of elongated wood means secured to the top wall of the support and extended along the length of the top wall, said wood means comprising laterally spaced wood members, a plurality of longitudinally spaced stand means for holding the support in a selected location, each of said stand means having arm means connected to the support and downwardly directed leg means, said arm means and leg means having cooperating means mounting the leg means on the arm means and allowing lateral adjustment of the leg means relative to the support, an endless belt having a top run supported on the wood members, idler pulley means engageable with one end of the belt, drive pulley means engageable with the other end of the belt, means to rotate the drive pulley means thereby moving the belt relative to the support, cover support means attached to the stand means, ridge means extended between and connected to adjacent cover support means, said ridge means being located above and extended in the direction of the length of the support, said ridge means having longitudinal lip means providing a downwardly open longitudinal groove, cover means extended between adjacent stand means, said cover means having a longitudinal flange means located in said longitudinal groove and cooperating with said lip means to allow the cover means to be moved from a first position in engagement with the cover support means to enclose the support and belt and to a second position away from the support and belt to provide access thereto, and means for connecting the cover means to the support to hold the cover means in said first position.

2. The apparatus of claim 1 wherein: said cover means includes a first cover having a longitudinal flange located in said groove cooperating with the lip means to movably mount the first cover on the ridge means, and a second cover having a longitudinal flange located in said groove cooperating with the lip means to movably mount the second cover on the ridge means.

3. The apparatus of claim 1 wherein: said leg means include vertically adjustable means for adjusting the elevation of the support.

4. The apparatus of claim 1 wherein: the belt has a bottom run, said support has spaced flange means located below the top wall thereof, and means attached to the flange means for supporting the bottom run of the belt.

5. The apparatus of claim 1 wherein: said cover means includes a first cover and a second cover each having a first section and a second section angularly disposed relative to the first section.

6. The apparatus of claim 1 wherein: the support includes, side walls attached to the top wall, and inwardly directed flanges attached to the side walls, and rod means attached to the flanges, said belt having a bottom run supported between the side walls on the rod means.

7. The apparatus of claim 1 wherein: the wood members comprise first wood members attached to the top wall, and second wood members attached to the top wall, said second wood members being laterally spaced from the first wood members to form a longitudinal groove.

8. Means for covering a conveyor assembly comprising: spaced stand means adapted to support a conveyor assembly, cover support means attached to the stand means, ridge means connected to the support means, said ridge means being located above the conveyor assembly and extended between adjacent stand means, said ridge means comprising an elongated member having a first downwardly directed lip and a second downwardly directed lip providing a downwardly open longitudinal groove, said groove being located between said first and second lips, cover means extended between adjacent stand means, said cover means including a first cover having a flange cooperating with the first lip to movably mount the first cover on the ridge means and cover support means, and a second cover having a flange cooperating with the second lip to movably mount the second cover on the ridge means and support means whereby the cover means can be moved from a first position in engagement with the cover support means to a second position away from the conveyor assembly, and means for connecting the cover means to the cover support means to hold the cover means in the first position.

9. The structure of claim 8 wherein: said stand means comprises a plurality of spaced stands, each stand having a cross member, a first arm secured to the cross member for supporting the conveyor, and a second arm secured to the cross member, said cover support means being attached to said first and second arms.

10. The structure of claim 8 wherein: said first cover and second cover each have a first section and a second section angularly disposed relative to the first section.

11. The structure of claim 10 wherein: said first and second covers include a shoulder cooperating with a portion of the support means to locate the cover in a first position on the support means.

* * * * *